US 11,474,866 B2

(12) United States Patent
Jones et al.

(10) Patent No.: US 11,474,866 B2
(45) Date of Patent: Oct. 18, 2022

(54) TREE STYLE MEMORY ZONE TRAVERSAL (71) Applicant: International Business Machines Corporation, Armonk, NY (US)

(72) Inventors: Stephen Merwyn Jones, Apalachin, NY (US); Brian Keith Thompson, Vestal, NY (US); Emily Kate Hugenbruch, Binghamton, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 442 days.

(21) Appl. No.: 16/567,119

(22) Filed: Sep. 11, 2019

(65) Prior Publication Data

US 2021/0073038 A1 Mar. 11, 2021

(51) Int. Cl.
*G06F 9/50* (2006.01)
*G06F 12/02* (2006.01)
*G06F 3/06* (2006.01)

(52) U.S. Cl.
CPC .......... *G06F 9/5016* (2013.01); *G06F 3/0617* (2013.01); *G06F 3/0644* (2013.01); *G06F 3/0679* (2013.01); *G06F 12/0246* (2013.01); *G06F 2212/222* (2013.01)

(58) Field of Classification Search
CPC .... G06F 9/5016; G06F 3/0617; G06F 3/0644; G06F 3/0679; G06F 12/0246; G06F 2212/222
See application file for complete search history.

(56) References Cited

U.S. PATENT DOCUMENTS

| 8,639,906 | B2 | 1/2014 | Acuna et al. |
| 8,892,843 | B2 | 11/2014 | Acuna et al. |
| 9,529,532 | B2 | 12/2016 | Kessler et al. |
| 2002/0059185 | A1* | 5/2002 | Woo ................ H04N 21/4332 |
| 2007/0245074 | A1* | 10/2007 | Rosenbluth ......... G06F 12/0875 711/110 |
| 2008/0215594 | A1* | 9/2008 | Kamei ................ G06F 16/43 |
| 2010/0064111 | A1* | 3/2010 | Kunimatsu ............ G06F 12/08 711/161 |
| 2015/0120649 | A1* | 4/2015 | Nakadai ............... G06F 3/0644 707/609 |
| 2016/0283274 | A1* | 9/2016 | Kochunni ............. G06F 9/5022 |
| 2018/0052765 | A1* | 2/2018 | Imbierski .............. G06F 12/023 |
| 2020/0104056 | A1* | 4/2020 | Benisty ............... G06F 12/0246 |

* cited by examiner

*Primary Examiner* — Tasnima Matin
(74) *Attorney, Agent, or Firm* — Cantor Colburn LLP; Edward Wixted (57) ABSTRACT Aspects of the invention include systems and methods for tree style memory zone traversal. A non-limiting example computer-implemented method includes receiving, by a processor, a request from a requestor for available memory space in a main memory. The processor searches a plurality of memory zones in the main memory for the requested available memory space, wherein the memory zones are arranged in a ring structure and a separate tree structure, and the searching is based at least in part on both of the ring structure and the tree structure. In response to the processor finding the requested available memory space, processor allocates the found available memory space to the requestor.

20 Claims, 6 Drawing Sheets

TREE STYLE MEMORY ZONE TRAVERSAL

BACKGROUND

The present invention generally relates to memory management and more specifically, to tree style memory zone traversal.

Distributed computing systems are increasingly processing complex operations that require additional memory. In some instances, various sources request additional memory to complete their operations. The central computing system manages memory requests and allocates available memory to the various resources.

SUMMARY

Embodiments of the present invention are directed to tree style memory zone traversal. A non-limiting example computer-implemented method includes receiving, by a processor, a request from a requestor for available memory space in main memory. The processor searches a plurality of memory zones in the main memory for the requested available memory space, wherein the memory zones are arranged in a ring structure and a separate tree structure, and the searching is based at least in part on both of the ring structure and the tree structure. In response to the processor finding the requested available memory space, processor allocates the found available memory space to the requestor.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide method and systems for increasing efficiency when searching for available memory space. In particular, one or more embodiments of the present invention assist in reducing search times and in avoiding cache contention events that can occur during a search.

Middleware, for example, a hypervisor, manages memory requests to use memory from main memory for hundreds or thousands of guest operating systems as well as its own processes. Modern hypervisors operate to allow dynamic addition and removal of memory from main memory in response to requests from the system administrator. Main memory is divided into multiple memory zones. A memory zone is a range of memory in main memory that is further subdivided into increments. The size of the increments is known as "increment size" and is based in part on a hardware level and maximum memory size. A memory zone cannot span two increments of memory, but multiple memory zones can span a single increment. Historically, the number of memory zones was dependent on the number of processors available to the hypervisor. However, the basis for the number of memory zones a hypervisor manages has shifted to the increment size. This has resulted in the possibility of a greater number of memory zones being created than when the number of memory zones was dependent upon the number of processors. Each memory zone is further divided into individual frames of memory. For the purposes of this disclosure, memory requests are performed in terms of frames.

Furthermore, the nature of the memory space in the memory zones has also changed. One issue with historical memory management systems was that they did not support dynamic removal of memory. Memory zones were previously divided into only two types, less than 2 GB and greater than 2 GB memory zones. To allow the system administrator to dynamically remove some memory, the nature of memory zone types changed to include reconfigurable memory which can be removed, and permanent memory which cannot be removed. This introduced a third type of memory zone from which a memory management system must choose between when resolving a request for memory from a requestor, for example, guest operating system, or a host process request.

The increase in the number of memory zones and the types of memory zones has led to overall performance issues. In particular, systems relying heavily on memory, but having relatively limited available space, have seen an overall decrease in performance due to inefficient searching for available space in the memory zones. The task of searching for available memory space has become increasingly time consuming and difficult due to the number of memory zones and types of memory that needs to be traversed to find available space. Furthermore, in some instances, multiple processors are simultaneously searching for available memory space, which leads to undesirable performance due to cache contention. Additionally, a linear search of the memory zones when no frames are available causes further performance related issues.

One or more embodiments of the present invention address one or more of the above-described shortcomings of the prior art by providing systems and methods that decrease search times and avoid cache contention events by organizing memory space into a ring structure and a tree structure. During a searching operation, a processor will first search a memory zone in a set of memory zones arranged in a ring structure, if no available space is found in the memory zone, the processor will search the tree structure. In a memory-rich state, the processor is likely to find available space in a memory zone in the ring structure. In a memory-scarce state, searching the tree structure is more efficient than continuously searching different memory zones. Furthermore, the system maintains an available frame count at each node of the tree, so that full traversal is not necessary to discover empty branches, which helps avoid cache contention, and eliminates traversal when no frames are available.

Figure 1:
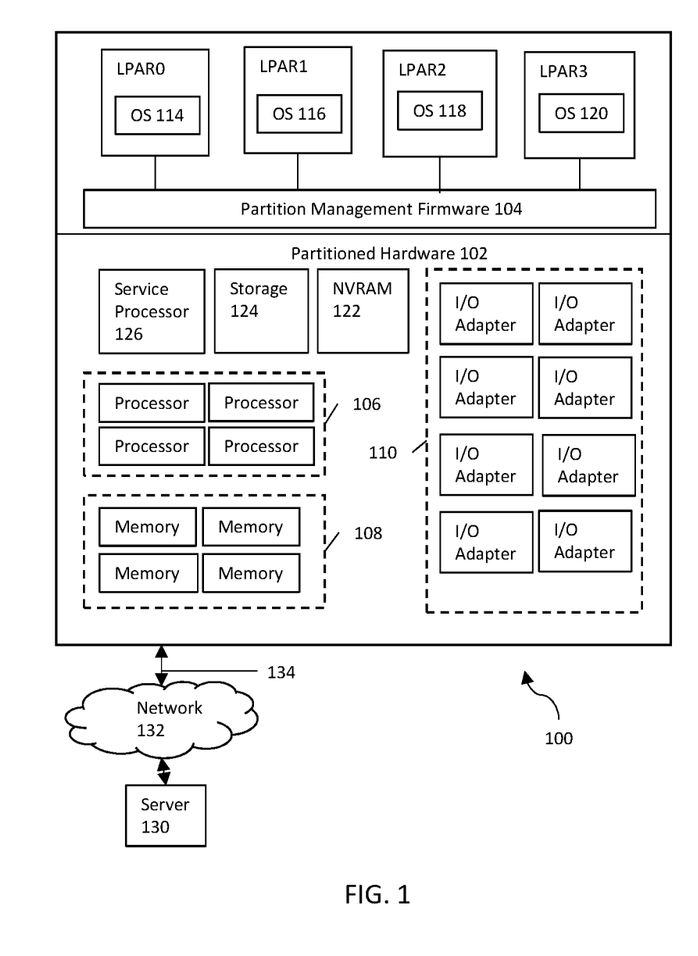
FIG. 1 illustrates a block diagram of components of a system in accordance with one or more embodiments of the present invention.

Turning now to FIG. 1, a block diagram of an embodiment of a logically partitioned data processing system for use in searching for available memory space is shown. It will be understood that the present invention may be executed in a variety of systems, including a variety of computing systems and electronic devices.

The data processing system 100 shown in FIG. 1 includes partitioned hardware 102. Partitioned hardware 102 includes the hardware components of the data processing system 100 that can be allocated into LPARs (Logical Partitions that host operating systems) and managed by partition management firmware 104 (this number does not appear in the figure). For purposes of example, the data processing system 100 is described with reference to the partitioned hardware, rather than a schematic showing how components of the hardware are interconnected. It will be understood, however, that the hardware components within partitioned hardware 110 of the data processing system 100 are connected by multiple buses or other communication devices for communicating information within the data processing system 100. The buses, for example, may include low-latency and higher latency paths connected by bridges and adapters and controlled by multiple controllers (not shown). Further, it will be understood that in addition to the components illustrated in the data processing system 100, additional components may be implemented within the data processing system 100.

Within partitioned hardware 102, multiple hardware components include processors 106, memory units 108, and input/output (I/O) adapters 110. Processors 106 may be general-purpose processors, during normal operation, process data under the control of the operating system and the application software is accessible from a dynamic storage device such as random access memory (RAM) and a static storage device such as Read Only Memory (ROM) built-in with each processor. In addition, memory units 108 may include multiple types of volatile and non-volatile memory, which are partitioned and accessible to processors 106.

In one example, memory units 108 may include on-demand memory that is activated and allocated only when needed by the data processing system 100. In addition, in one example, on-demand memory may be added to the total partitionable memory as accessible from other server systems via network 132, which is further described in detail hereafter.

In the example depicted, the data processing system 100 is defined to include four logical partitions (LPARs), where each LPAR includes a portion of available processors 106, memory units 108, and I/O adapters 110. A separate operating system (OS) instance executes within each LPAR. For example, OS 114 operates in LPAR0, OS 116 operates in LPAR1, OS 118 operates in LPAR 2, and OS 120 operates in LPAR3. It will be understood that while the data processing system 100 is defined to include four LPARs, resources are not automatically allocated for four LPARs. Further, it will be understood that any number of LPARs may be defined for a data processing system 100 depending on an increment size of memory in the memory zones. In particular, configurable determinations can be made for different partition implementations.

In one example of the implementation of a partition management layer, non-volatile random-access memory (NVRAM) 122 may store a table identifying resource allocation among the LPARs. Partition management firmware 104, executing on service processor 126, accesses the table from NVRAM 122 to provide for memory mapping and other partition security measures.

In some embodiments of the present invention, examples of non-volatile mediums are a mass storage device 124 and NVRAM 122 which as depicted are internal components of the data processing system 100, but will be understood to also be provided by an external device. Volatile media include dynamic memory such as RAM.

Transmission media include coaxial cables, copper wire or fiber optics, including the wires that comprise buses (not depicted). Transmission media can also take the form of acoustic or light waves, such as those generated during radio frequency or infrared data communications.

In addition, the partition management firmware 104 may receive requests for borrowed memory from any of the allocated LPARs. Partition management firmware 104 then determines whether there any unallocated memory from the total memory available to the system can be loaned to a partition, on the condition that the memory will be returned if requested by partition management firmware 104. The table in NVRAM 122 is adjusted to reflect the loaned memory. It will be understood that the table and other data controlled by partition management firmware 104 may be stored in a data storage system other than NVRAM 122. Furthermore, it will be understood that partition management firmware 104 may be implemented using a hypervisor or other middleware enabled to allocate and control partitions within a data processing system 100.

In some embodiments of the present invention, the operating systems or application software within each LPAR and partition management firmware 104 contain machine executable instructions that when executed on processors 106 or service processor 126 carry out the operations as described herein. Alternatively, embodiments of the present invention might be performed by specific hardware components that contain hardwired logic for performing the steps, or by any combination of programmed computer components and custom hardware components.

Moreover, embodiments of the present invention may be downloaded as a computer program product, wherein the program instructions may be transferred from a remote computer such as a server 130 to requesting the data processing system 100 by way of data signals embodied in a carrier wave or other propagation medium via a network link 134 to a communications interface of the data processing system 100. The communications interface provides a two-way data communications coupling to network link 134 that may be connected, for example, to a local area network (LAN), wide area network (WAN), or directly to an Internet Service Provider (ISP). In particular, network link 134 may provide wired and/or wireless network communications to one or more networks.

Network link 134 in turn provides data communication services through network 132. Network 132 may refer to the worldwide collection of networks and gateways that use a particular protocol, such as Transmission Control Protocol (TCP) and Internet Protocol (IP), to communicate with one another. Alternatively, network 132 may refer to a local network, a private network, or other networks created for the distribution of information and computing resources, such as a grid computing network. Network link 134 and network 132 both use electrical, electromagnetic, or optical signals that carry digital data streams. The signals through the various networks and the signals on network link 134 and through the communication interface, which carry the digital data to and from the data processing system 100, are exemplary forms of carrier waves transporting the information.

It is important to note that in addition to server 130 providing a computer program product, server 130 may enable a remote management interface for a system administrator or remote manager to direct dynamic reconfiguration commands to partition management firmware 104 via network 132. In particular, when a system administrator or remote manager chooses to explicitly direct dynamic reconfiguration, partition management firmware 104 receives commands to allocate or deallocate resources to partitions and adjusts the allocation of resources according to the commands.

Figure 2:
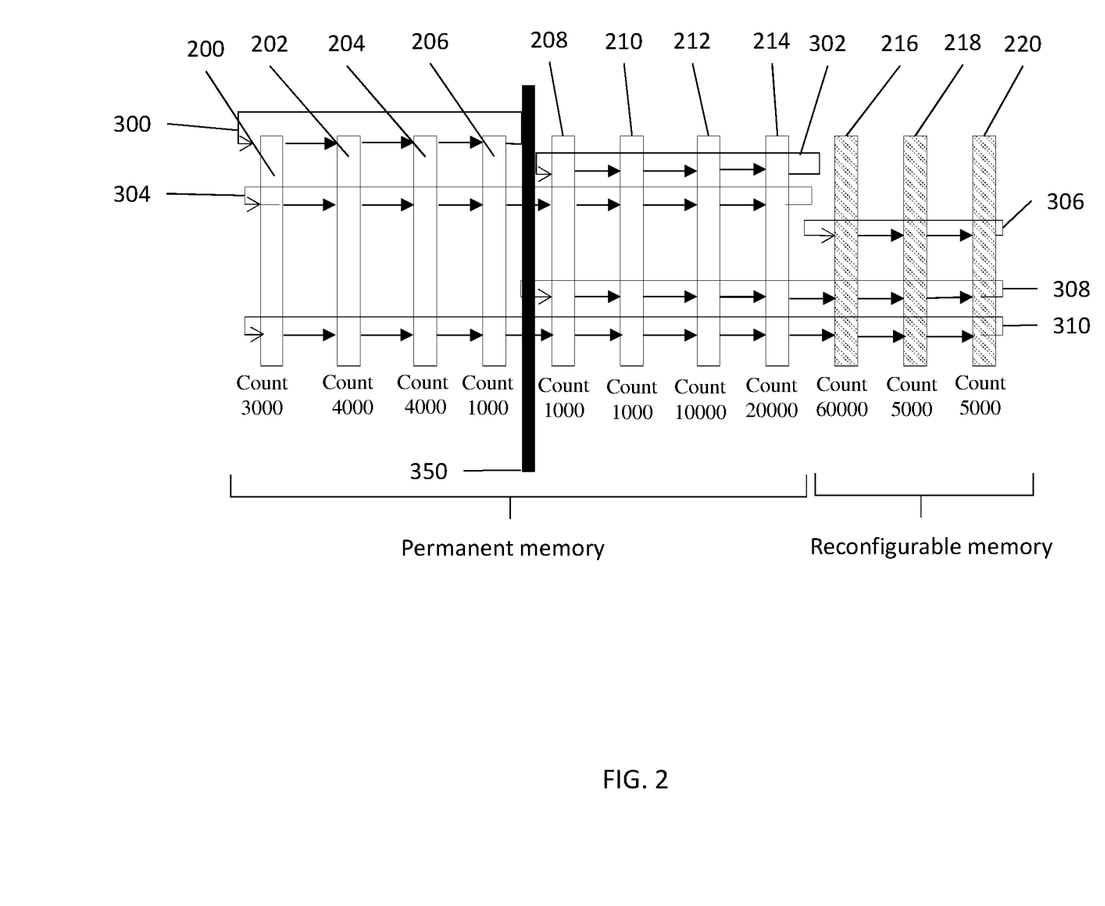
FIG. 2 illustrates a block diagram of memory zones arranged in a ring structure in accordance with one or more embodiments of the present invention.

Referring to FIG. 2, a diagram illustrating memory zones arranged in a ring structure is generally shown in accordance with one or more embodiments of the present invention. As shown in FIG. 2, a first set of memory zones 200, 202, 204, 206 are connected by a first ring 300. In addition, a second set of memory zones 208, 210, 212, 214 are connected by a second ring 302, a third set of memory zones 200, 202, 204, 206, 208, 210, 212, 214, are connected by a third ring 304, a fourth set of memory zones 216, 218, 220 are connected by a fourth ring 306, a fifth set of memory zones 208, 210, 212, 214, 216, 218, 220 is connected by a fifth ring 308, and a sixth set of memory zones 200, 202, 204, 206, 208, 210, 212, 214, 216, 218, 220 are connected by a sixth ring 310. Each ring 300, 302, 304, 306, 308, 310 includes pointers that point to a respective subsequent memory zone and a last memory zone points back to the initial memory zone, thereby forming the ring.

As shown in FIG. 2, the first set of memory zones 200, 202, 204, 206, and the second set of memory zones 208, 210, 212, 214 are memory zones of permanent memory. The fourth set of memory zones 216, 218, 220 are memory zones of reconfigurable memory zones. The fifth set of memory zones 208, 210, 212, 214, 216, 218, 220 and the sixth set of memory zones 200, 202, 204, 206, 208, 210, 212, 214, 216, 218, 220 include both permanent memory and reconfigurable memory.

The memory zones 200, 202, 204, 206, 208, 210, 212, 214, 216, 218, 220 are divided by a threshold memory barrier into two sub-groups based on a size of memory that processes can utilize. As seen in FIG. 2, this division 350 is shown to illustrate the division. In some embodiments, this division 350 is set at 2 GB, where a first subset of memory zones 200, 202, 204, 206 include less than 2 GB memory and a second subset 208, 210, 212, 214, 216, 218, 220 include greater than 2 GB memory. This division relates to the requirements requestors have, for example, a 32-bit process may be only able to operate using memory from the less than 2 GB memory zone. It should be appreciated that the threshold memory barrier is adjustable based on the needs and functionalities of computing systems.

For illustration purposes potential counts of available frames are shown. For example, a memory zone 200 is shown as having a count of 3000 available frames. It should be appreciated that although FIG. 2 displays eleven memory zones, a typical system includes a far greater number of memory zones.

Figure 3:
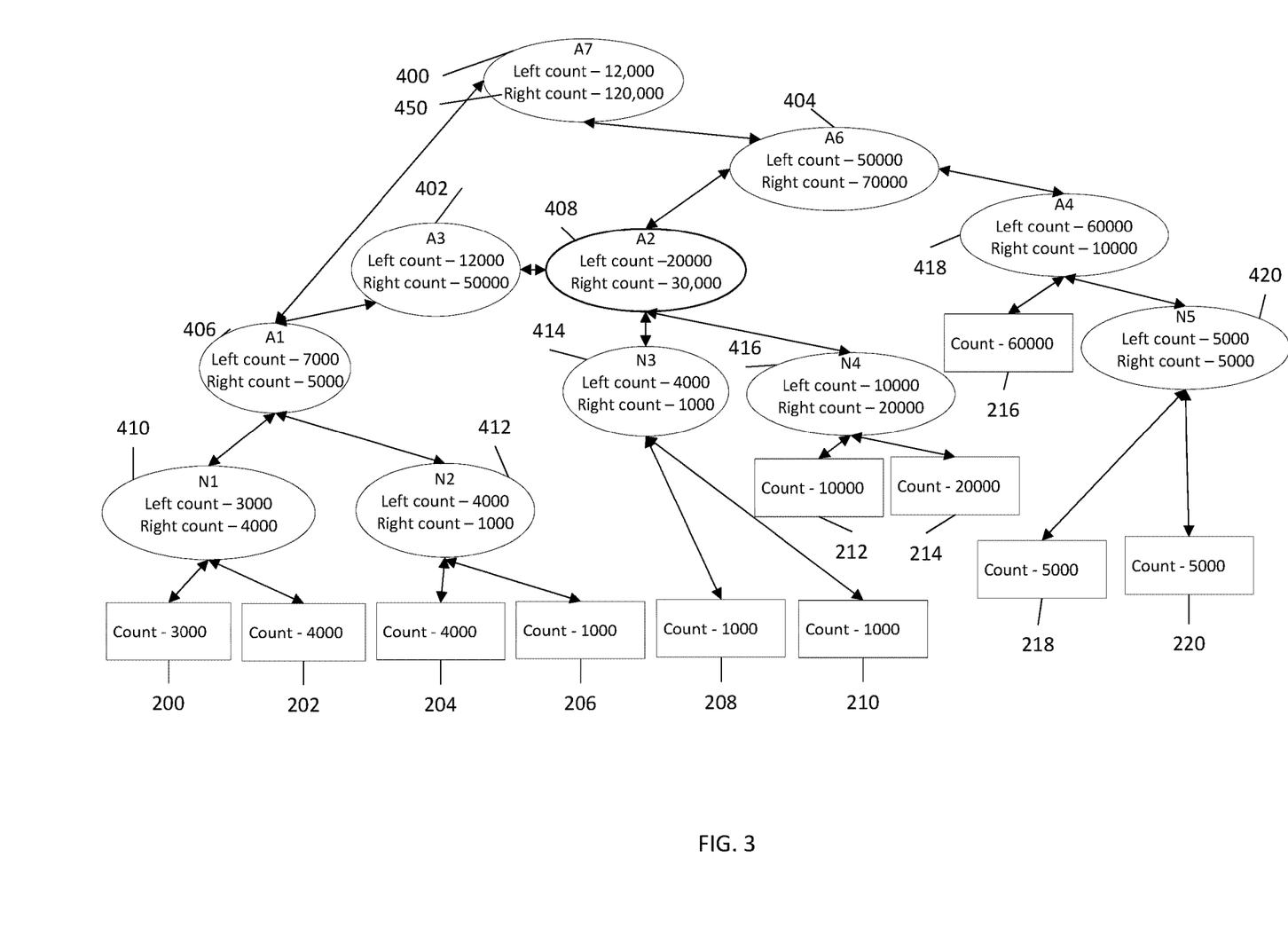
FIG. 3 illustrates a block diagram of memory zones arranged in a tree structure in accordance with one or more embodiments of the present invention.
Figure 4:
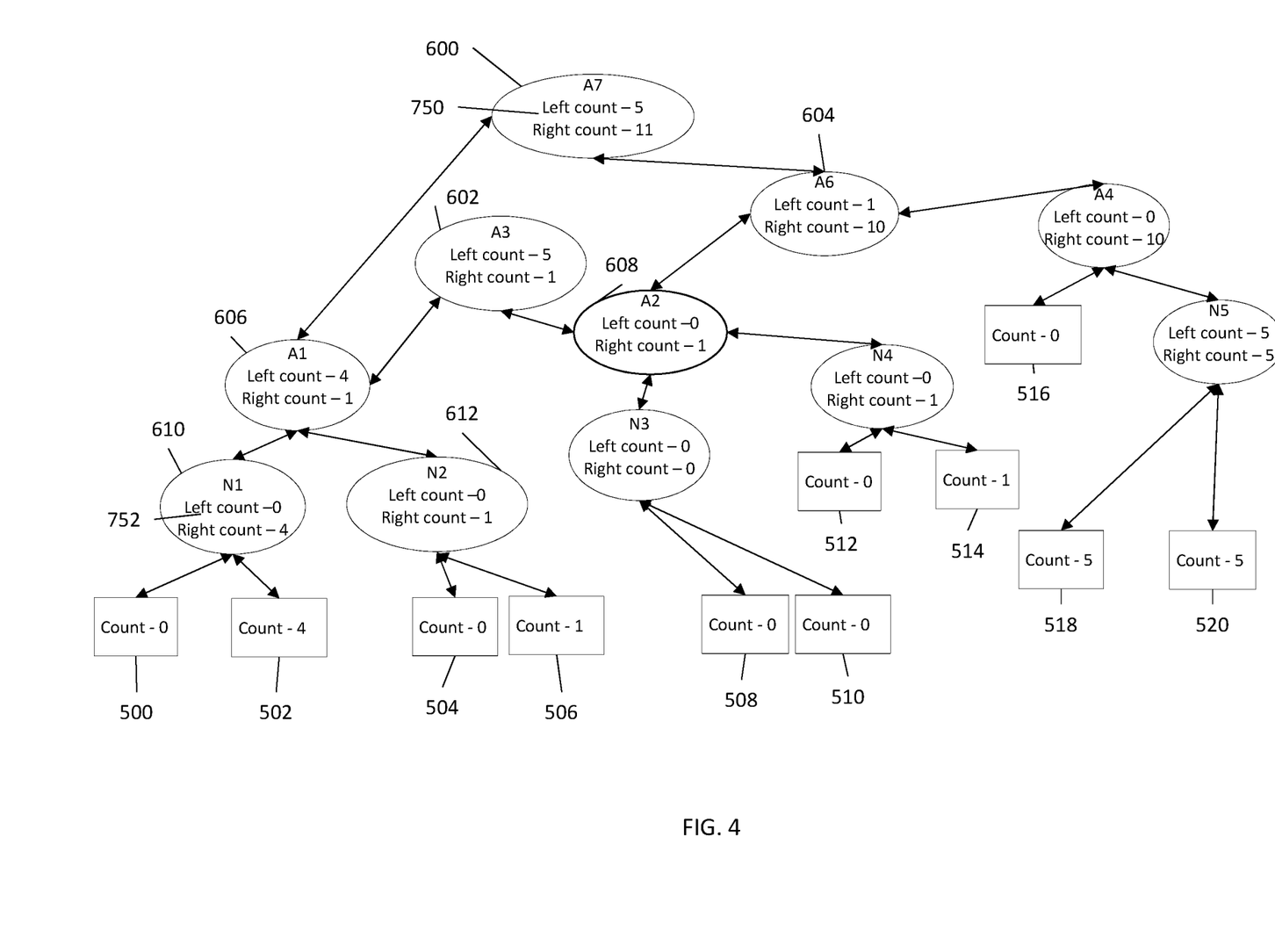
FIG. 4 illustrates a block diagram of memory zones arranged in a tree structure in accordance with one or more embodiments of the present invention.
Figure 5:
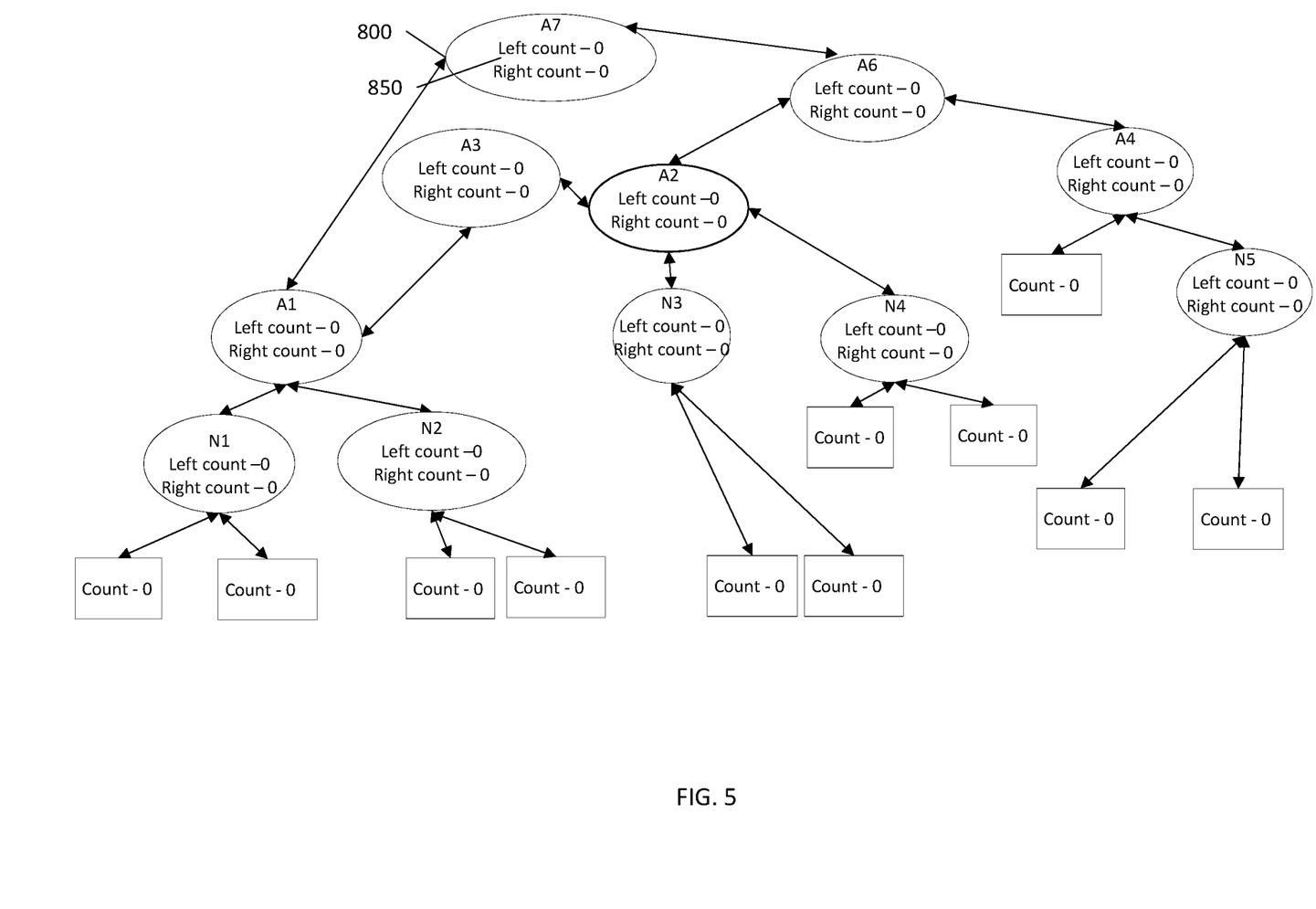
FIG. 5 illustrates a block diagram of memory zones arranged in a tree structure in accordance with one or more embodiments of the present invention.

Referring to FIGS. 3-5, a diagram illustrating memory zones arranged in a tree structure are shown in accordance with one or more embodiments of the present invention. Referring to FIG. 3, the memory zones 200, 202, 204, 206, 208, 210, 212, 214, 216, 218, 220 are arranged in a tree structure, in which each node 400, 402, 404, 406, 408, 410, 412, 414, 416, 418, 420 includes a respective pointer to a left child and a right child. In addition to a pointer to each child, each node 400, 402, 404, 406, 408, 410, 412, 414, 416, 418, 420 includes a counter of available memory frames based on whether a right path or a left path is chosen. The base level of the tree in FIG. 3 includes each of the memory zones 200, 202, 204, 206, 208, 210, 212, 214, 216, 218, 220.

Referring to FIG. 3, a memory-rich system is shown. For illustrative purposes, a path from a root node 400 to a memory zone 200 is described. The root node 400 is a parent to a left child node 406 and a right child node 404. The middleware chooses the left child node 406, which is a parent to a second left child node 410 and a second right child node 412. The middleware chooses the second left child node 410 that points to a memory zone 200. In this case the tree structure is not the most efficient way to satisfy a memory request, but visiting the last used memory zone in the ring structure shown in FIG. 2 was likely to find a suitable memory zone and thus the middleware would not need to use the tree structure.

Following the path from the root node 400 to the memory zone 200, a counter 450 is illustrated at the root node 400. If the middleware chooses to follow a path from the root node 400 to the left child node 406, the counter 450 shows that 12,000 frames of memory are available. If the middleware chooses to follow a path from the root node 400 to the right child node 404, the counter 450 shows that 120,000 frames of memory are available. If the middleware chose to follow the path to the left child node 406, this leads to the possibility of reaching a memory zone from the first set of memory zones 200, 202, 204, 206. If the middleware chose to follow the path to the right child node 404, this leads to the possibility of reaching a memory zone from the fifth set of memory zones 208, 210, 212, 214, 216, 218, 220.

The nodes are divided into static nodes 400, 402, 404, 406, 408, 418 and variable nodes 410, 412, 414, 416, 420. The static nodes remain part of the tree and are not removed or added. The variable nodes depend upon the number of memory zones that are created. As memory zones are added and removed, variable nodes are responsively added or removed from a tree. As illustrated, the static nodes are denoted with an alphanumeric name beginning with an "A", and the variable child nodes are denoted with an alphanumeric name beginning with an "N".

Referring to FIG. 4, a diagram illustrating memory zones arranged in a tree structure are shown. For illustrative purposes, a path from a root node 600 to a memory zone 502 is described. The root node 600 is a parent to a left child node 606 and a right child node 604. The counter 750 shows that the path to the left child node 606 leads to potential five available memory frames. The middleware chooses the left child node 606, which is a parent to a second left child node 610 and a second right child node 612. The middleware chooses the second left child node 610, but at this point, the middleware reads the counter 752 and detects that left path leads to a memory zone 500 with no available frames, and as a result, the middleware chooses the right path, which leads to a memory zone 502 with four available frames of memory. This is more efficient than traversing the ring structure in FIG. 2, because several memory zones are completely empty and do not need to be considered. Examining the memory zones is also undesirable because this memory reference would bring them into local cache and could lead to increased cache contention.

Referring to FIG. 5, a diagram illustrating memory zones arranged in a tree structure are shown. FIG. 5 illustrates an instance of no available resources. In this instance, the middleware encounters the root node 800 and reads the counter 850, which indicates that no memory space is available. At this point, the middleware suspends the search operation and performs some other operation to free up memory space. Under previous systems and methods, each memory zone would have been traversed, which costs time and system resources.

In some embodiments of the present invention, memory zones are created and removed as the system is operating. As memory is initialized and memory zones are created, the memory zone is added under the appropriate parent node. An additional variable node will be generated as a parent node for the newly created memory zone as needed. In some embodiments of the present invention, the binary nature of the nodes is maintained.

In instances, in which an additional node is created as the middleware is searching for available frames, the middleware determines whether the additional node falls along a possible path the middleware has chosen. If in the instance, that the additional node does potentially fall along the path, the middleware continues to intuitively traverse the nodes to reach a memory zone with available frames. Because adding an additional memory zone affects only the parent node and the associated counts, exclusive access of the entire tree is not necessary.

Figure 6:
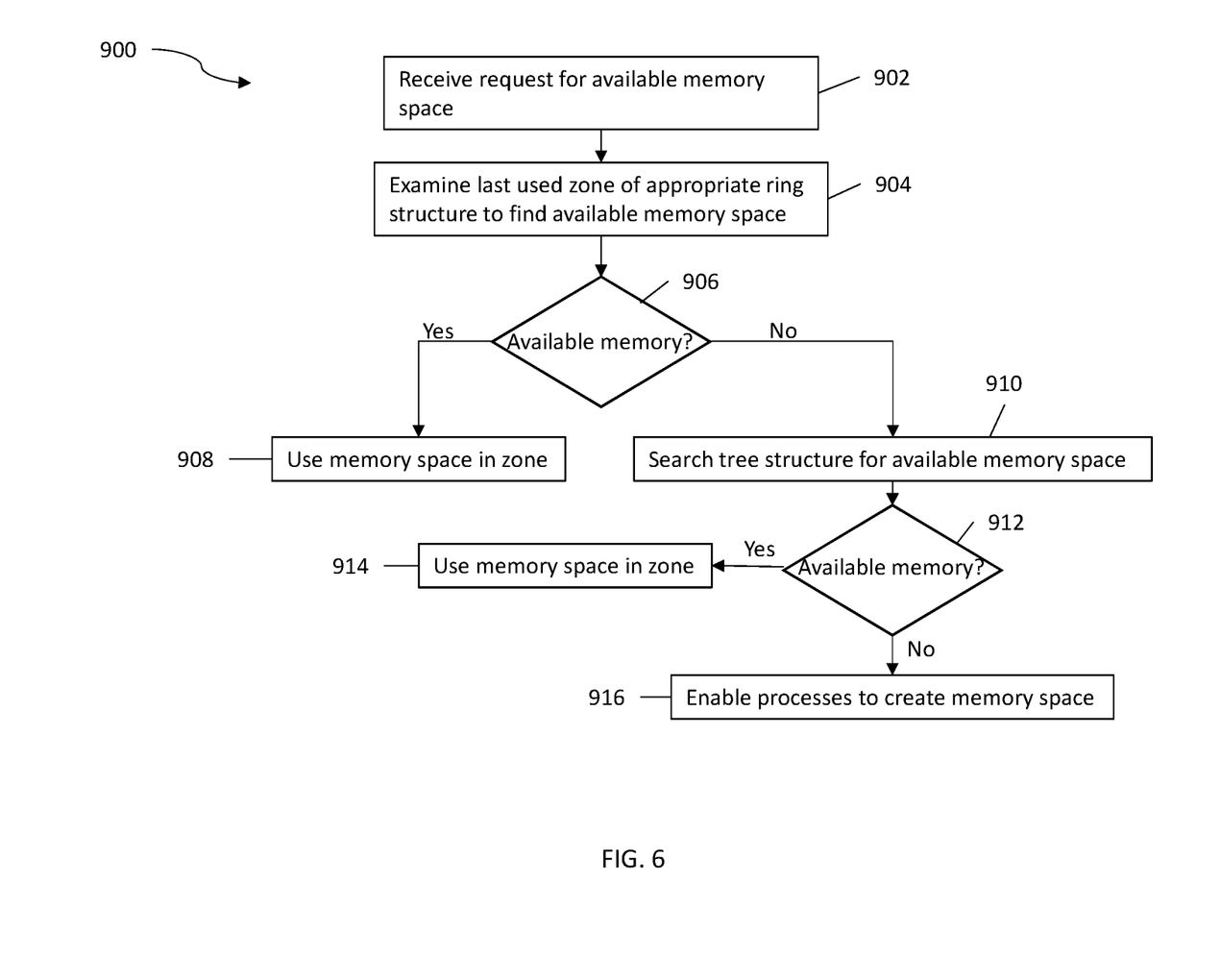
FIG. 6 illustrates a flow diagram of a method for searching for available memory space in accordance with one or more embodiments of the present invention.

Referring to FIG. 6, a flow diagram for describing a method 900 for searching for available memory space is shown in accordance with one or more embodiments of the present invention. At block 902, middleware receives a request for memory space in main memory from a requestor. The request includes the requirements including, but not limited to, less than 2 GB, greater than 2 GB, permanent memory, reconfigurable memory, type of operation, and importance of request. The middleware examines the last memory zone used in the appropriate ring structure at block 904. The last used memory zone is the memory zone that the middleware last allocated memory from and is located in a ring of memory zones that matches the requestor's needs. At block 906, the middleware examines the available frame counter of the last memory zone used in the appropriate ring to determine whether any memory is available in that memory zone. If the memory zone has available memory space, the middleware allocates the memory space to the requesting guest operating system at block 908.

In some embodiments, prior to allocating the memory space, the middleware determines whether the amount of available memory space is greater than a threshold amount. If the amount of available space is greater than the threshold amount, the middleware allocates memory space to the requestor. If the amount of available memory space is less than the threshold amount, the middleware searches each sequential memory zone in the ring to locate an amount of available memory space greater than the threshold amount. This permits the middleware to allocate the available memory space to a requestor based on system optimization, predicted memory requests requirements, or other desired objectives while searching memory zones in a ring that match a requesters needs.

If no available memory space was detected in the examined memory zone from the appropriate ring, the middleware searches for available memory space arranged in the tree structure at block 910. The middleware begins at the appropriate static node and follows one or more paths of nodes based on the type and amount of memory requested to reach a memory zone with available memory space. The middleware determines whether memory space that matches the requested requirements is found at block 912. If the middleware finds available memory space, it allocates the memory space to the requesting guest operating system at block 914. If the middleware does not find memory space that matches the requested requirements, it initiates processes to free up memory space at block 916.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising,"

when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, a request from a requestor for available memory space in main memory;
   searching, by the processor, a memory zone of a plurality of memory zones in the main memory for the requested available memory space, wherein the plurality of memory zones is arranged in a ring structure and a separate tree structure, the separate tree structure being searched in response to having searched the ring structure;
   in response to meeting a condition of not finding the requested available memory space in the last used memory zone of the ring structure, searching the tree structure for the requested available memory space, wherein the tree structure comprises nodes, each of the nodes comprising a first count for a first path and a second count for a second path, the first and second counts totaling an available memory space in the plurality of memory zones;
   determining that the requested available memory space is found in the memory zone by searching the tree structure; and
   allocating, in response to the processor finding the requested available memory space, the found available memory space to the requestor.

2. The method of claim 1 further comprising:
   searching a last used memory zone in the ring structure prior to searching the tree structure; and
   allocating, in response to finding the requested available memory space in the last used memory zone, the found available memory space to the requestor.

3. The method of claim 1 further comprising:
   searching a last used memory zone in the ring structure prior to searching the tree structure; and
   searching, in response to not finding the requested available memory space in the last used memory zone of the ring structure, the tree structure for the requested available memory space;
   allocating, in response to finding available memory space, the found available memory space to the requestor.

4. The method of claim 1 further comprising:
   receiving a type of memory and an amount of memory space with the request for available memory space;
   searching for available memory space based on the requested type of memory and the amount of memory space.

5. The method of claim 1, wherein the plurality memory zones include memory zones of permanent memory space and memory zones of reconfigurable memory space.

6. The method of claim 1 wherein the ring structure includes a plurality of rings that respectively connect subsets of memory zones based on a type of memory and an amount of memory space.

7. The method of claim 1, wherein the tree structure comprises at least one static node in communication with at least one memory zone.

8. The method of claim 1, wherein the plurality of memory zones are divided into a first group of memory zones having memory space for less than a threshold memory barrier and a second group of memory zones having memory space for greater than the threshold memory barrier.

9. The method of claim 8, wherein the first group comprises memory zones of permanent memory and the second group comprises memory zones of permanent memory space and memory zones of reconfigurable memory space.

10. A system comprising:
a memory having computer readable instructions; and
one or more processors for executing the computer readable instructions, the computer readable instructions controlling the one or more processors to perform operations comprising:
  receiving, by a processor, a request from a requestor for available memory space in main memory;
  searching, by the processor, a memory zone of a plurality of memory zones in the main memory for the requested available memory space, wherein the plurality of memory zones is arranged in a ring structure and a separate tree structure, the separate tree structure being searched in response to having searched the ring structure;
  in response to meeting a condition of not finding the requested available memory space in the last used memory zone of the ring structure, searching the tree structure for the requested available memory space, wherein the tree structure comprises nodes, each of the nodes comprising a first count for a first path and a second count for a second path, the first and second counts totaling an available memory space in the plurality of memory zones;
  determining that the requested available memory space is found in the memory zone by searching the tree structure; and
  allocating, in response to the processor finding the requested available memory space, the found available memory space to the requestor.

11. The system of claim 10, wherein the one or more processors are further configured to perform operations comprising:
  searching a last used memory zone in the ring structure prior to searching the tree structure; and
  allocating, in response to finding the requested available memory space in the last used memory zone, the found available memory space to the requestor.

12. The system of claim 10, wherein the one or more processors are further configured to perform operations comprising:
  searching a last used memory zone in the ring structure prior to searching the tree structure; and
  allocating, in response to finding available memory space, the found available memory space to the requestor.

13. The system of claim 10, wherein the one or more processors are further configured to perform operations comprising:
  receiving a type of memory and an amount of memory space with the request for available memory space;
  searching for available memory space based on the requested type of memory and the amount of memory space.

14. The system of claim 10, wherein the plurality of memory zones include memory zones of permanent memory space and memory zones of reconfigurable memory space.

15. The system of claim 10, wherein the ring structure includes a plurality of rings that respectively connect subsets of memory zones based on type of memory and amount of memory space.

16. The system of claim 10, wherein the tree structure comprises at least one static node in communication with at least one memory zone.

17. The system of claim 10, wherein memory zones of the plurality of memory zones are divided into a first group of memory zones having memory space less than a threshold memory barrier and a second group having memory space greater than the threshold memory barrier.

18. The system of claim 17, wherein the first group comprises memory zones of permanent memory and the second group comprises memory zones of permanent memory space and memory zones of reconfigurable memory space.

19. A computer program product comprising a computer readable storage medium having program instructions embodied therewith, the program instructions executable by a processor to cause the processor to perform operations comprising:
  receiving, by a processor, a request from a requestor for available memory space in main memory;
  searching, by the processor, a memory zone of a plurality of memory zones in the main memory for the requested available memory space, wherein the plurality of memory zones is arranged in a ring structure and a separate tree structure, the separate tree structure being searched in response to having searched the ring structure;
  in response to meeting a condition of not finding the requested available memory space in the last used memory zone of the ring structure, searching the tree structure for the requested available memory space, wherein the tree structure comprises nodes, each of the nodes comprising a first count for a first path and a second count for a second path, the first and second counts totaling an available memory space in the plurality of memory zones;
  determining that the requested available memory space is found in the memory zone by searching the tree structure; and
  allocating, in response to the processor finding the requested available memory space, the found available memory space to the requestor.

20. The computer program product of claim 19, wherein the processor is further configured to perform operations comprising:
  searching a last used memory zone in the ring structure prior to searching the tree structure; and
  allocating, in response to finding the requested available memory space in the last used memory zone, the found available memory space to the requestor.

* * * * *